(12) United States Patent
Kim et al.

(10) Patent No.: US 10,170,742 B2
(45) Date of Patent: Jan. 1, 2019

(54) BATTERY PACK HAVING ELECTRIC INSULATING PACK CASE

(71) Applicant: LG CHEM, LTD., Seoul (KR)

(72) Inventors: Han Chul Kim, Daejeon (KR); Dong Cheol Lee, Daejeon (KR); Ho Yul Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 317 days.

(21) Appl. No.: 15/024,540

(22) PCT Filed: Jul. 25, 2014

(86) PCT No.: PCT/KR2014/006776
§ 371 (c)(1),
(2) Date: Mar. 24, 2016

(87) PCT Pub. No.: WO2015/046733
PCT Pub. Date: Apr. 2, 2015

(65) Prior Publication Data
US 2016/0233470 A1  Aug. 11, 2016

(30) Foreign Application Priority Data
Sep. 30, 2013 (KR) ........................ 10-2013-0116358

(51) Int. Cl.
*H01M 2/10* (2006.01)
*H01M 10/42* (2006.01)
(Continued)

(52) U.S. Cl.
CPC ......... *H01M 2/1094* (2013.01); *H01M 2/021* (2013.01); *H01M 2/0212* (2013.01);
(Continued)

(58) Field of Classification Search
CPC .................................. H01M 2/02; H01M 2/10
(Continued)

(56) References Cited

U.S. PATENT DOCUMENTS

2004/0251872 A1  12/2004  Wang et al.
2006/0199075 A1   9/2006  Moon et al.
(Continued)

FOREIGN PATENT DOCUMENTS

CN  101103473 A  1/2008
CN  203218397 U  9/2013
(Continued)

OTHER PUBLICATIONS

International Search Report, issued in PCT/KR2014/006776, dated Nov. 20, 2014.

*Primary Examiner* — James Lee
(74) *Attorney, Agent, or Firm* — Birch, Stewart, Kolasch & Birch, LLP

(57) ABSTRACT

Disclosed herein is a battery pack including an electrically insulative pack case. The battery pack includes a plate-shaped battery cell having an anode terminal and a cathode terminal formed at one side thereof including a sealed surplus portion, the battery cell being formed to have a planar quadrangular structure, a protection circuit module (PCM) electrically connected to the electrode terminals of the battery cell to control operation of the battery pack, the PCM being loaded on the sealed surplus portion of the battery cell, and a pack case applied to the sealed surplus portion of the battery cell, the PCM, and opposite sides of the battery cell in a thermally molten state and solidified, the pack case being configured to have a structure to cover the sealed surplus portion of the battery cell, the PCM, and the opposite sides of the battery cell in a state in which the top and bottom of the battery cell are open.

14 Claims, 8 Drawing Sheets

(51) Int. Cl.
   *H01M 2/02*       (2006.01)
   *H01M 10/0525*    (2010.01)

(52) U.S. Cl.
   CPC ..... *H01M 2/1061* (2013.01); *H01M 10/0525* (2013.01); *H01M 10/425* (2013.01); *H01M 2010/4271* (2013.01); *H01M 2220/30* (2013.01)

(58) Field of Classification Search
   USPC .......................................................... 429/7
   See application file for complete search history.

(56) References Cited

U.S. PATENT DOCUMENTS

| | | |
|---|---|---|
| 2006/0266542 A1 | 11/2006 | Yoon |
| 2009/0202912 A1 | 8/2009 | Baba et al. |
| 2010/0003592 A1 | 1/2010 | Baba et al. |
| 2010/0203374 A1* | 8/2010 | Kano .................. H01M 2/1061 |
| | | 429/100 |
| 2010/0209764 A1 | 8/2010 | Heo et al. |
| 2011/0052976 A1 | 3/2011 | Ishii et al. |
| 2013/0034750 A1 | 2/2013 | Choi et al. |
| 2013/0130065 A1* | 5/2013 | Park .................... H01M 2/0275 |
| | | 429/7 |
| 2013/0157084 A1 | 6/2013 | Bang et al. |
| 2014/0023885 A1 | 1/2014 | Choi et al. |
| 2014/0141289 A1 | 5/2014 | Choi et al. |
| 2014/0147707 A1 | 5/2014 | Choi et al. |

FOREIGN PATENT DOCUMENTS

| | | |
|---|---|---|
| EP | 1717882 A1 | 11/2006 |
| JP | 2002-260609 A | 9/2002 |
| JP | 2005-340015 A | 12/2005 |
| JP | 2006-156402 A | 6/2006 |
| JP | 2012-221734 A | 11/2012 |
| KR | 10-2006-0032591 A | 4/2006 |
| KR | 10-2006-0113802 A | 11/2006 |
| KR | 10-2008-0036738 A | 4/2008 |
| KR | 10-2013-0018127 A | 2/2013 |
| KR | 10-2013-0018577 A | 2/2013 |
| TW | 447157 B | 7/2001 |
| TW | 466790 B | 12/2001 |
| TW | 504854 B | 10/2002 |
| TW | 200635104 A | 10/2006 |
| TW | 201320441 A1 | 5/2013 |

* cited by examiner

[FIG. 1]
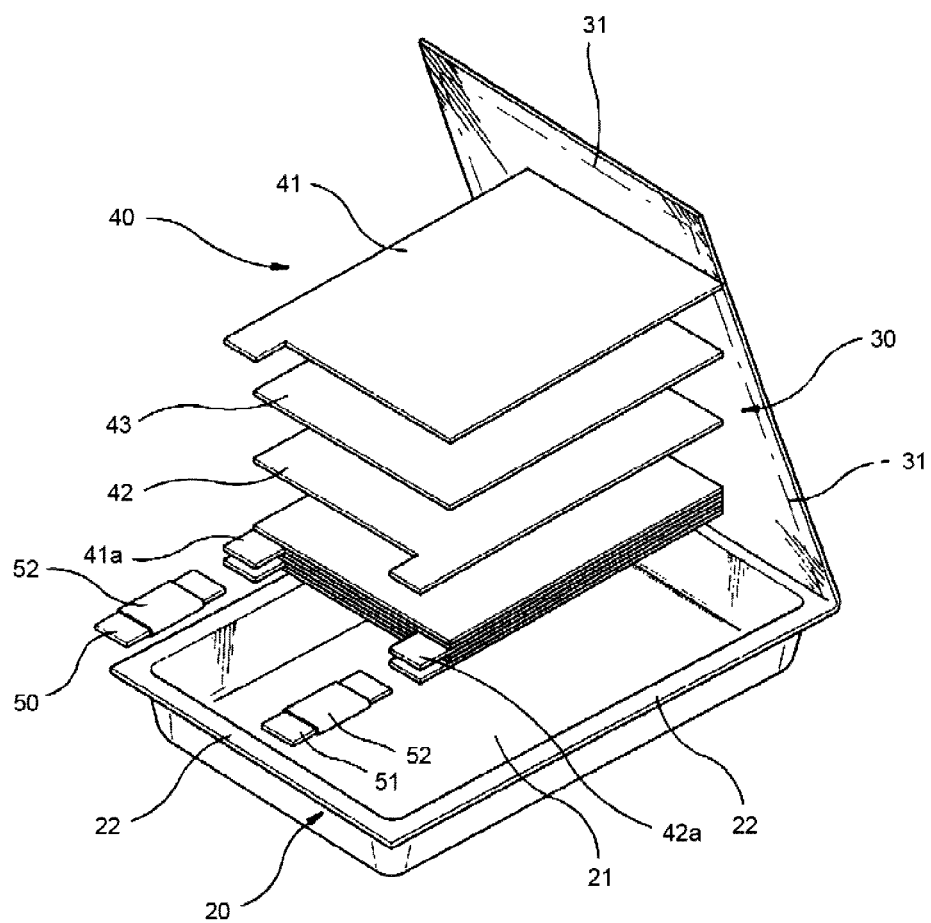

[FIG. 2]
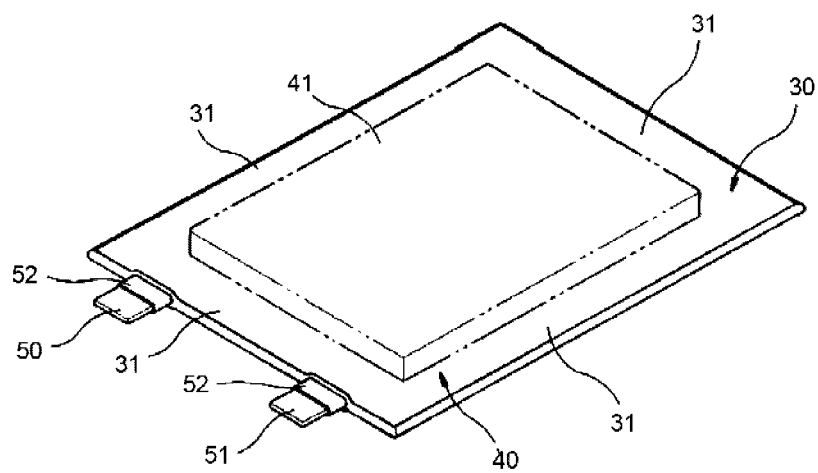
[FIG. 3]
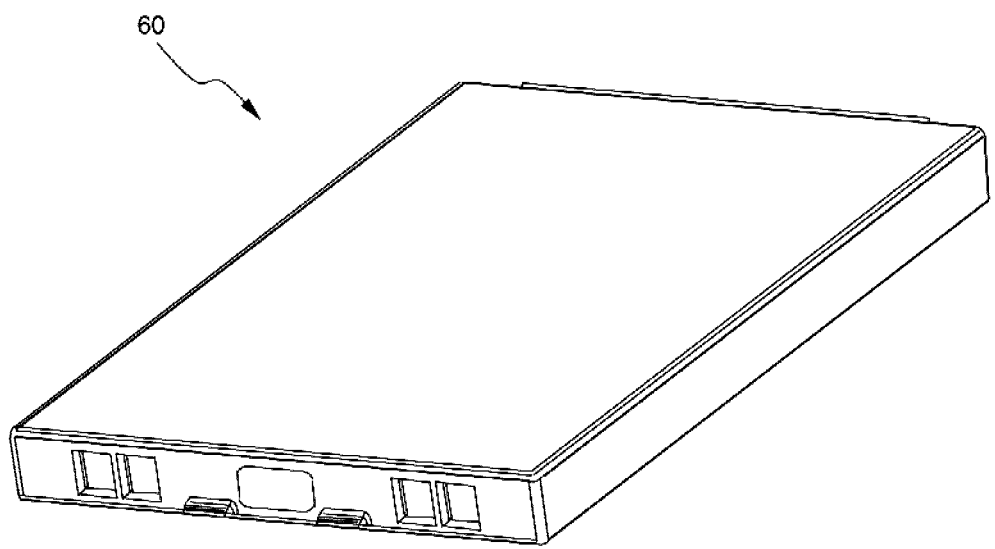

[FIG. 4]
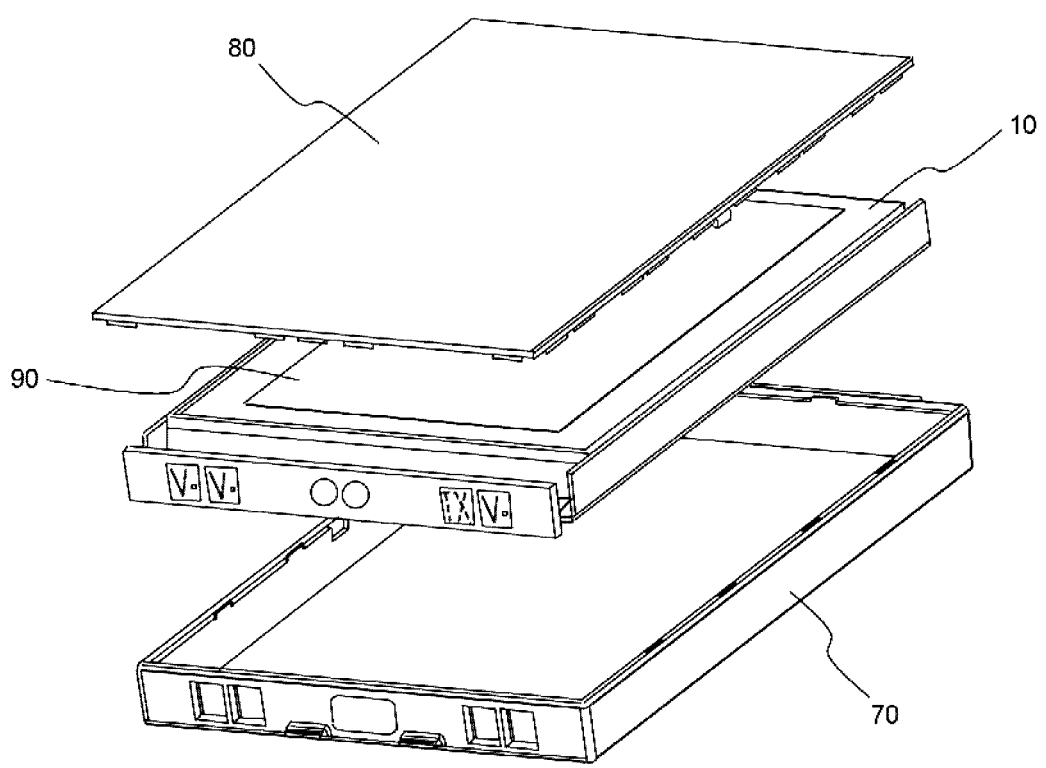

[FIG. 5]
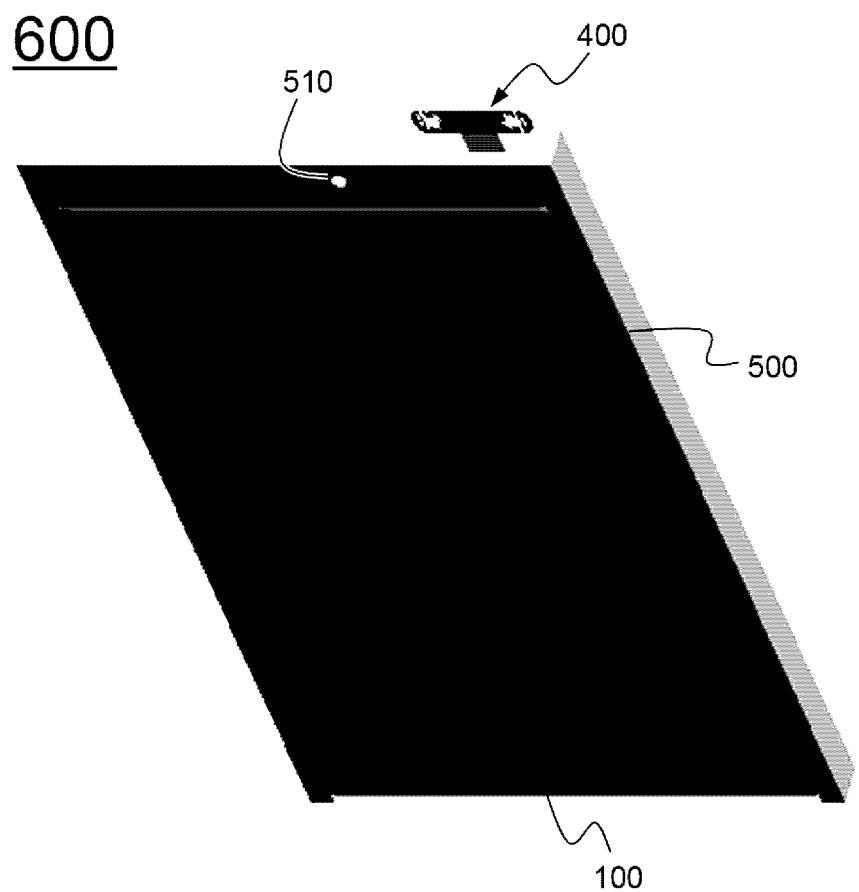

[FIG. 6]
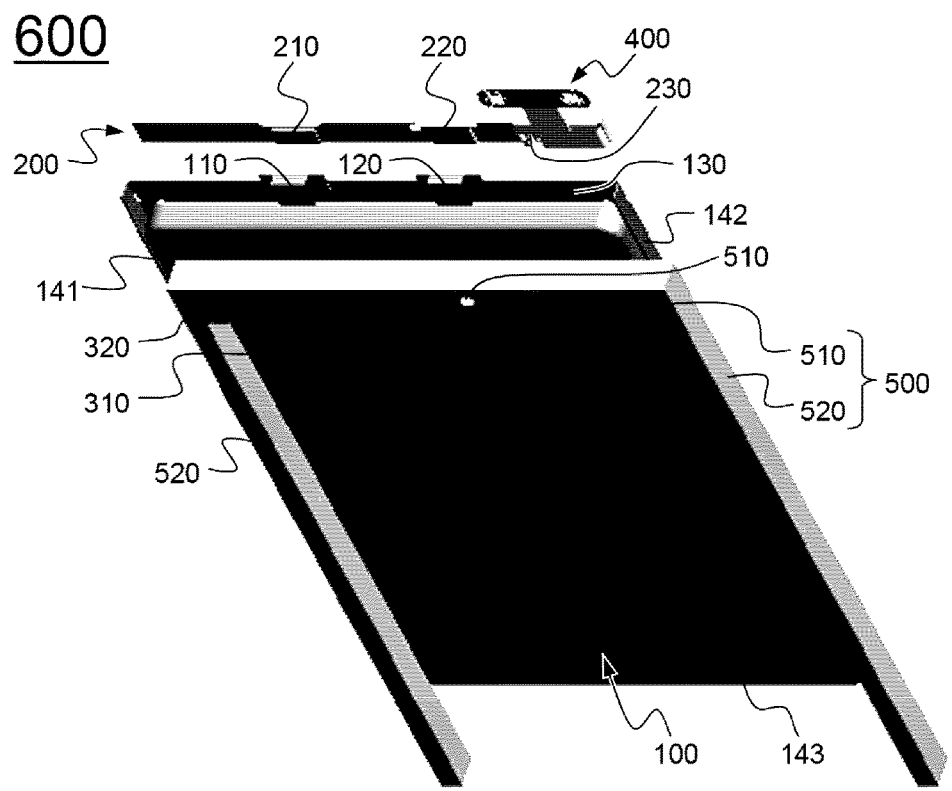
[FIG. 7]
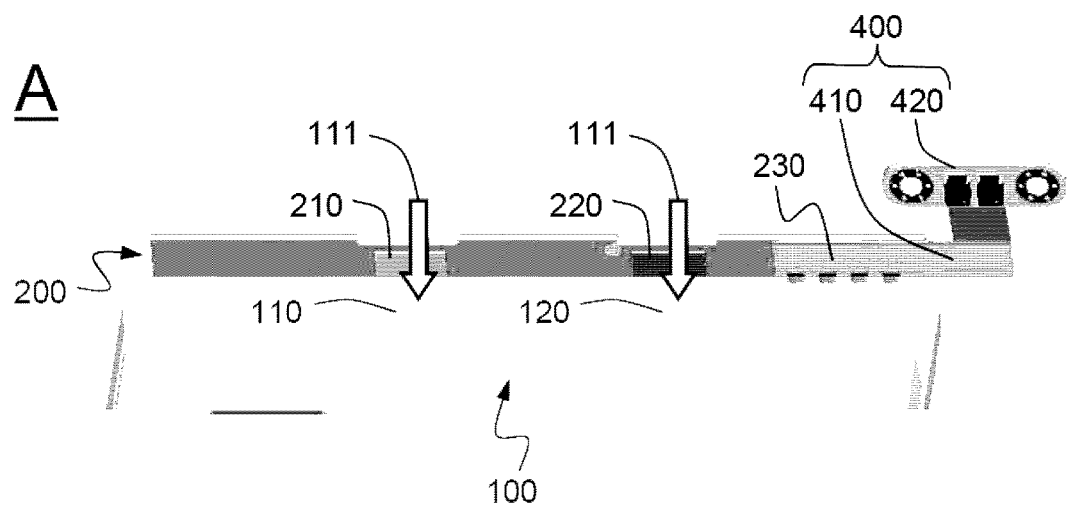

[FIG. 8]
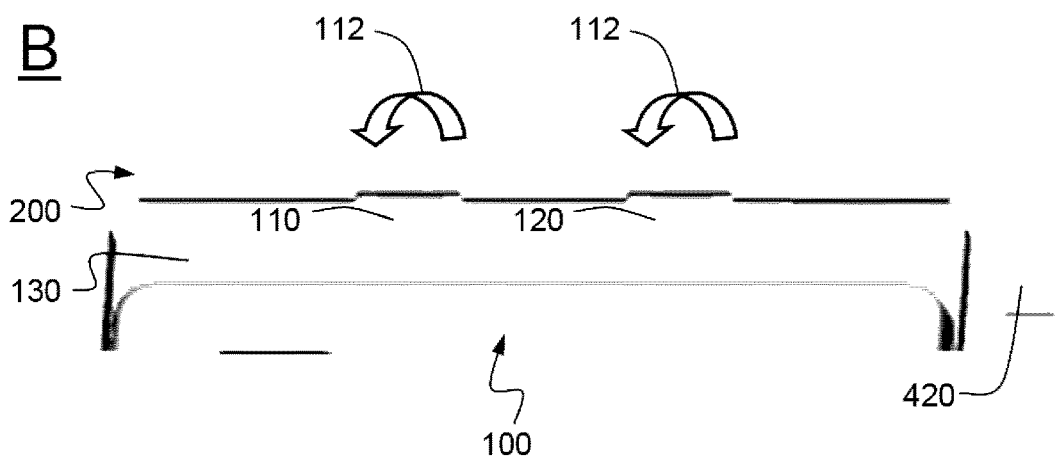
[FIG. 9]
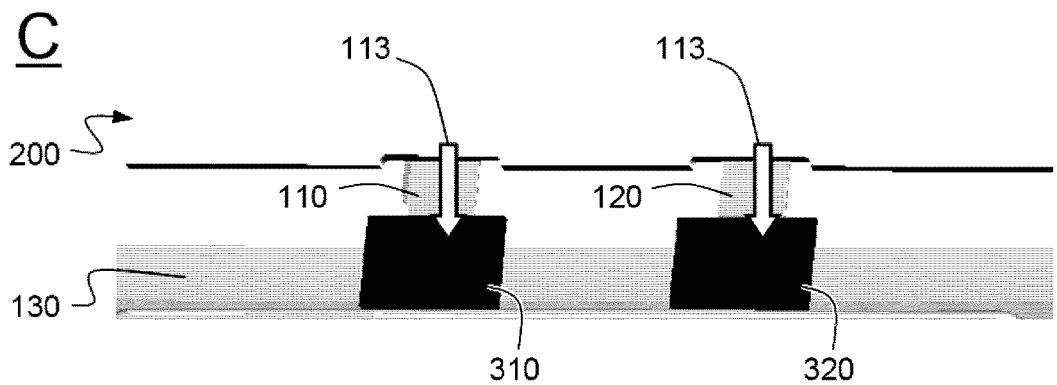

[FIG. 10]
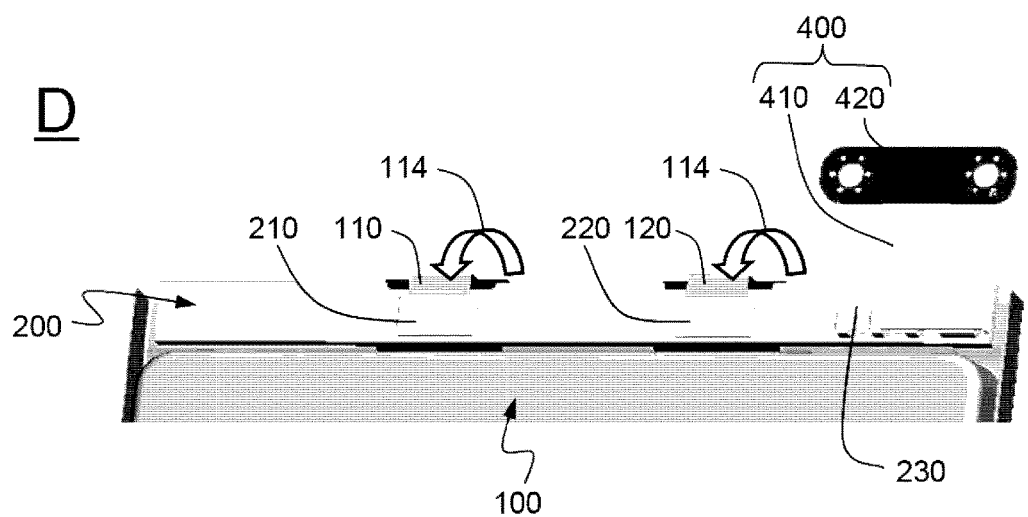

【FIG. 11】
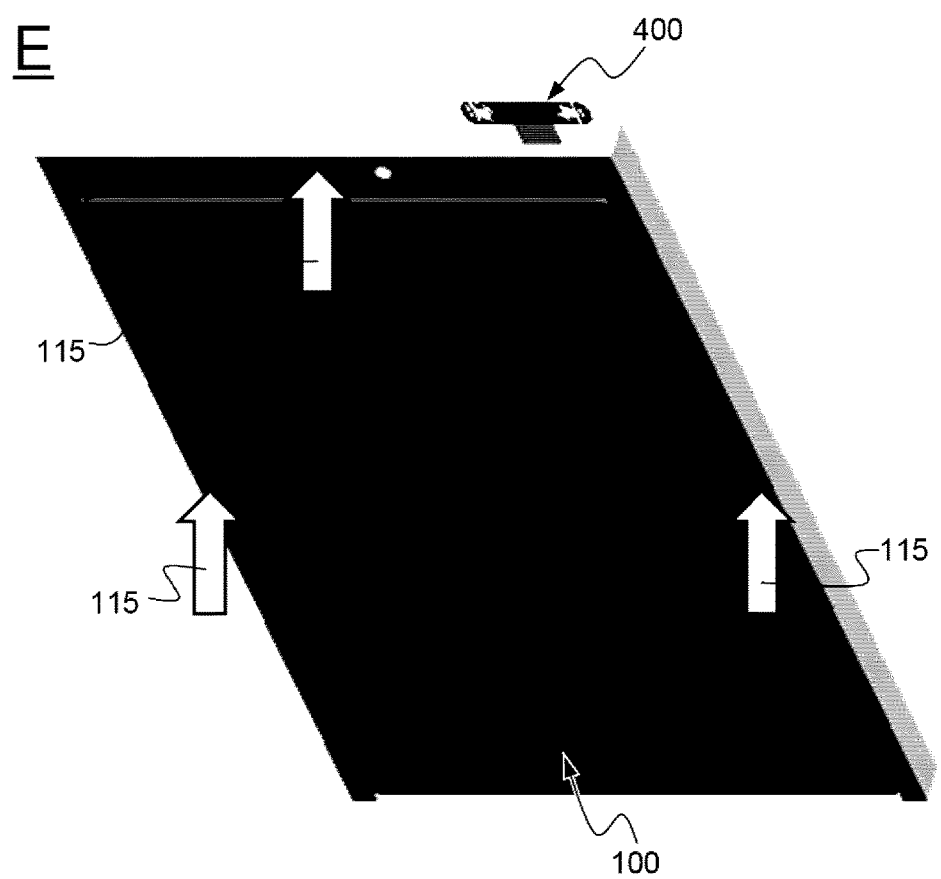

BATTERY PACK HAVING ELECTRIC INSULATING PACK CASE

TECHNICAL FIELD

The present invention relates to a battery pack including an electrically insulative pack case and, more particularly, to a battery pack including a plate-shaped battery cell having an anode terminal and a cathode terminal formed at one side thereof including a sealed surplus portion, the battery cell being formed to have a planar quadrangular structure, a protection circuit module (PCM) electrically connected to the electrode terminals of the battery cell to control operation of the battery pack, the PCM being loaded on the sealed surplus portion of the battery cell, and a pack case applied to the sealed surplus portion of the battery cell, the PCM, and opposite sides of the battery cell in a thermally molten state and solidified, the pack case being configured to have a structure to cover the sealed surplus portion of the battery cell, the PCM, and the opposite sides of the battery cell in a state in which the top and bottom of the battery cell are open.

BACKGROUND ART

As mobile devices have been increasingly developed and the demand for such mobile devices has increased, the demand for secondary batteries has sharply increased as an energy source for the mobile devices. Among such secondary batteries is a lithium secondary battery having high energy density and discharge voltage, into which much research has been carried out and which is now commercialized and widely used.

Based on the appearance thereof, the lithium secondary battery may be generally classified as a cylindrical battery, a prismatic battery, or a pouch-shaped battery. Based on the type of an electrolyte, the lithium secondary battery may be generally classified as a lithium ion battery or a lithium ion polymer battery.

A recent trend in the miniaturization of mobile devices has increased the demand for a prismatic battery or a pouch-shaped battery, which has a small thickness. An exploded perspective view of a pouch-shaped battery and a perspective view of an assembled state of the pouch-shaped battery are typically shown in FIGS. 1 and 2, respectively.

Referring to FIGS. 1 and 2, a pouch-shaped battery 10 includes a pouch-shaped case 20 having an inner space 21 of a predetermined size, a cover 30 hingedly connected to the pouch-shaped case 20, an electrode assembly 40 mounted in a receiving part 21 of the pouch-shaped case 20, the electrode assembly 40 including cathode plates 41, anode plates 42, and separators 43, electrode tabs 41a and 42a extending ends of the cathode plates 41 and the anode plates 42 of the electrode assembly 40, respectively, and electrode terminals 50 and 51 connected to the electrode tabs 41a and 42a, respectively.

A side extension part 22 of a predetermined width for thermal bonding is formed at an upper edge of the receiving part 21 of the pouch-shaped case 20. Middle portions of the electrode terminals 50 and 51 respectively connected to the electrode tabs 41a and 42a are coated with terminal tapes 52 made of an insulative material to prevent the occurrence of a short circuit between the electrode terminals 50 and 51 when the side extension part 22 of the pouch-shaped case 20 is thermally bonded to a side part 31 of the cover 30 using a thermal bonding device (not shown).

The conventional pouch-shaped battery with the above-stated construction is manufactured as follows.

First, the electrode assembly 40 including the cathode plates 41, the anode plates 42, and the separators 43 is mounted in the receiving part 21 of the pouch-shaped case 20 and then a predetermined amount of an electrolyte is injected into the inner space of the pouch-shaped case 20. At this time, the electrode tabs 41a and 42a of the electrode assembly 40 are respectively connected to the electrode terminals 50 and 51, the middle portions of which are coated with the terminal tapes 52. The electrode terminals 50 and 51 and the terminal tapes 52 partially protrude outward from the pouch-shaped case 20 and the cover 30.

Subsequently, the cover 30 is brought into tight contact with the pouch-shaped case 20 and then the side extension part 22 of the pouch-shaped case 20 is thermally bonded to the side part 31 of the cover 30 using the thermal bonding device (not shown) such that the electrolyte does not leak from the pouch-shaped case 20.

The shape of a representative battery pack having the pouch-shaped battery with the above-stated construction mounted therein is shown in FIG. 3 and a separated state of the battery pack before being assembled is typically shown in FIG. 4.

Referring to FIGS. 3 and 4, a battery pack 60 includes a rectangular battery 10 having an electrode assembly including cathodes, anodes, and separators received therein together with an electrolyte in a sealed state, a case body 70 having an inner space to receive the battery 10, and an upper cover 80 coupled to the case body 70, in which the battery 10 is received, to seal the battery 10. Between the case body 70 and the battery 10 and between the upper cover 80 and the battery 10 are attached double-sided adhesive tapes 90.

In general, the battery pack 60 with the above-stated construction is assembled by coupling the upper cover 80 to the case body 70, which is made of a plastic material, such as polycarbonate (PC) or acrylonitrile-butadiene-styrene (ABS), using an ultrasonic welding method. The ultrasonic welding method is a method of thermally bonding two surfaces using a frictional heat generated due to vibration based on a high frequency of 20,000 Hz.

However, the demand for a battery pack having a smaller thickness has increased. In recent years, therefore, the thickness of the case body 70 and the upper cover 80 has been reduced to 0.3 to 0.35 mm. As a result, it is difficult to perform die molding and injection molding. In addition, welding strength is reduced with the result that a welding defect rate is increased.

For a battery using a can as a battery case, on the other hand, it is possible to provide proper strength against external impact due to structural characteristics of the can even in a case in which the thickness of the battery case is small. However, the pouch-shaped battery 10 having the structure shown in FIG. 1 has low strength against external impact due to structural characteristics of the pouch-shaped battery 10. For this reason, application of a case having a small thickness to the pouch-shaped battery 10 is limited.

Furthermore, when external impact is applied to the battery pack 60, the battery 10 may move upward and downward in the inner space defined between the case body 70 and the upper cover 80 although the battery 10 is coupled to the case body 70 and the upper cover 80 using the double-sided adhesive tapes 90 with the result that a short circuit or a cut off may occur in the battery pack 60.

Specifically, when the pouch-shaped battery are located in an inner space of a pack case constituted by the case body 70 and the upper cover 80, an empty space is formed between the pouch-shaped battery and the inside of the upper end of the pack case due to electrode terminals, a protection circuit module (PCM), an insulating member, etc. mounted or coupled to the upper end of the pouch-shaped battery. The upper end of the battery is relatively weak. When the battery pack falls or external impact is applied to the battery pack, therefore, the battery may be easily deformed with the result that the battery may have defects. For example, when the battery moves toward the upper end of the inner space of the pack case due to falling of the battery pack or external impact applied to the battery pack, a short circuit may occur due to electric contact between the devices. On the other hand, when the battery moves toward the lower end of the inner space of the pack case, electrical connection between the devices located at the upper end of the battery may be cut off Consequently, there is a high necessity for a battery pack that can be easily manufactured and has proper strength against external impact and high resistance to a short circuit or a cut off while using a case having a small thickness.

DISCLOSURE

Technical Problem

Therefore, the present invention has been made to solve the above problems, and other technical problems that have yet to be resolved.

It is an object of the present invention to provide a battery pack including a pack case made of a material applied to a sealed surplus portion of a battery cell, a protection circuit module (PCM), and opposite sides of the battery cell in a thermally molten state and solidified such that the battery pack has proper strength against external impact and high resistance to a short circuit or a cut off although the pack case has a small thickness.

It is another object of the present invention to provide a battery pack including a pack case configured to have a specific structure such that the number of components constituting the battery pack is reduced, thereby reducing manufacturing cost and improving efficiency of a battery pack assembly process.

Technical Solution

In accordance with one aspect of the present invention, the above and other objects can be accomplished by the provision of a battery pack including a plate-shaped battery cell having an anode terminal and a cathode terminal formed at one side thereof including a sealed surplus portion, the battery cell being formed to have a planar quadrangular structure, a protection circuit module (PCM) electrically connected to the electrode terminals of the battery cell to control operation of the battery pack, the PCM being loaded on the sealed surplus portion of the battery cell, and a pack case applied to the sealed surplus portion of the battery cell, the PCM, and opposite sides of the battery cell in a thermally molten state and solidified, the pack case being configured to have a structure to cover the sealed surplus portion of the battery cell, the PCM, and the opposite sides of the battery cell in a state in which the top and bottom of the battery cell are open.

In the battery pack according to the present invention, it is possible to locate and fix the battery cell in the pack case without using an ultrasonic welding method. Consequently, the size or the structure of the case is not greatly limited. In addition, movement of the battery cell in an inner space of the case is restrained, thereby preventing the occurrence of a short circuit or a cut off due to external impact.

In addition, the PCM may be loaded on the sealed surplus portion of the battery cell. Consequently, the battery pack according to the present invention has a more compact structure than a conventional battery pack. In addition, since the PCM is loaded on the sealed surplus portion of the battery cell at which the electrode terminals are located, electric wiring between the PCM and the electrode terminals may be simplified.

Furthermore, in the battery pack according to the present invention, the pack case having the specific structure as described above replaces a conventional sheathing frame member and a sheathing label, thereby reducing the number of components constituting the battery pack is reduced and, therefore, it is possible to reduce manufacturing cost and to improve efficiency of a battery pack assembly process.

In addition, in the battery pack according to the present invention, the pack case is configured to have a structure to cover the PCM and the opposite sides of the battery cell in a state in which the top and bottom of the plate-shaped battery cell are open. Consequently, the battery pack according to the present invention has a more compact structure than a conventional battery pack having a structure to cover the whole surface of the battery cell.

In a concrete example, each of the plate-shaped battery cells may be a prismatic secondary battery or a pouch-shaped secondary battery.

The prismatic secondary battery may be configured to have a structure in which an electrode assembly is received in a prismatic metal case in a sealed state and the pouch-shaped secondary battery may be configured to have a structure in which an electrode assembly is received in a battery case made of a laminate sheet including a metal layer and a resin layer in a sealed state.

The secondary battery may be a lithium secondary battery exhibiting high energy density, discharge voltage, and output stability. Other components of the lithium secondary battery will hereinafter be described in detail.

In general, the lithium secondary battery includes a cathode, an anode, a separator, and a non-aqueous electrolytic solution containing lithium salt.

The cathode may be manufactured, for example, by applying a mixture of a cathode active material, a conductive material, and a binder to a cathode current collector and drying the applied mixture. A filler may be further added as needed. On the other hand, the anode may be manufactured by applying an anode material to an anode current collector and drying the applied anode material. The above-mentioned ingredients may be further included as needed.

The separator is disposed between the anode and the cathode. The separator may be made of an insulative thin film exhibiting high ion permeability and mechanical strength.

The non-aqueous electrolytic solution containing lithium salt consists of a non-aqueous electrolyte and lithium salt. A liquid non-aqueous electrolytic solution, a solid electrolyte, or an inorganic solid electrolyte may be used as the non-aqueous electrolyte.

The current collectors, the electrode active materials, the conductive material, the binder, the filler, the separator, the electrolytic solution, and the lithium salt are well known in the art to which the present invention pertains and, therefore, a detailed description thereof will be omitted.

The lithium secondary battery may be manufactured using an ordinary method well known in the art to which the present invention pertains. That is, the lithium secondary battery may be manufactured by disposing a porous separator between a cathode and an anode and injecting an electrolytic solution thereinto.

The cathode may be manufactured, for example, by applying a slurry containing a lithium transition metal oxide active material, a conductive material, and a binder to a current collector and drying the applied slurry. In the same manner, the anode may be manufactured, for example, by applying a slurry containing a carbon active material, a conductive material, and a binder to a thin current collector and drying the applied slurry.

The pack case may have a thickness approximately corresponding to the thickness of the battery cell. For example, the pack case may have a thickness equal to the thickness of the battery cell or 1 to 10% greater than the thickness of the battery cell.

Specifically, the pack case is configured to have a structure to cover the PCM and the opposite sides of the battery cell in a state in which the top and bottom of the plate-shaped battery cell are open. Consequently, the battery pack according to the present invention has a more compact structure than a conventional battery pack having a structure to cover the whole surface of the battery cell. Furthermore, it is possible to utilize a space of the pack case occupied by the top and bottom of the battery cell in the conventional art as a space for electrical capacity. Consequently, it is possible to increase electrical capacity of the battery pack.

In addition, it is possible to directly dissipate heat generated from the battery cell outward since the top and bottom of the battery cell are exposed outward, thereby improving cooling efficiency. According to circumstances, a heat sink or a cooling member may be adjacently mounted to the top and/or bottom of the battery cell to effectively remove heat generated from the battery pack.

Consequently, the battery pack according to the present invention has a more compact structure than the conventional battery pack while having increased electrical capacity and more improved cooling efficiency.

Meanwhile, the PCM may be configured to have various forms. For example, the PCM may be a printed circuit board (PCB) having a protection circuit printed thereon.

In a concrete example, an insulating tape may be further attached between the sealed surplus portion and the PCM. The insulating tape is not particularly restricted so long as the insulating tape is capable of electrically insulating the sealed surplus portion and the PCM. For example, the insulating tape may be a double-sided adhesive tape having an adhesive material applied to opposite sides thereof.

Consequently, the PCM may be stably and securely loaded on the sealed surplus portion of the battery cell and a short circuit between the circuit devices mounted on the PCM and the sealed surplus portion of the battery cell may be prevented due to characteristics of the insulating tape.

One of the characteristics of the present invention is that the pack case is applied to the sealed surplus portion of the battery cell, the PCM, and the opposite sides of the battery cell in a thermally molten state and is then solidified. Consequently, it is possible for the pack case to absorb a shock due to falling of the battery pack and external impact applied to the battery pack and to retain electrical connection in the battery pack.

The material for the pack case is not particularly restricted so long as the material is thermally melted, applied to the sealed surplus portion of the battery cell, the PCM, and the opposite sides of the battery cell, and solidified. For example, the pack case may be made of a plastic resin. The plastic resin may be a thermoplastic resin, a melting point of which is within a temperature range in which deformation of devices located at the PCM is not caused. According to circumstances, however, the pack case may be made of an insulative material which is applied to the sealed surplus portion of the battery cell, the PCM, and the opposite sides of the battery cell and then solidified by chemical reaction or physical reaction. The chemical reaction may be a reaction in which a material is solidified due to hardening based on heat, light (visible light, ultraviolet light, etc.), a catalyst, etc. The physical reaction may be a reaction in which a material is solidified due to evaporation of a solvent.

According to circumstances, the pack case may further cover a lower end of the battery cell.

In a concrete example, the pack case may be provided at one side thereof corresponding to the sealed surplus portion of the battery cell with a through hole, through which a portion of the PCM received in the pack case is exposed outward. The portion of the PCM may be a battery cell test point.

The battery cell test point is a contact portion that is capable of testing various functions of the battery pack after the completion of the battery pack assembly process. For example, the battery cell test point may test overvoltage protection. However, function tests are not particularly restricted so long as the function tests are carried out to test electrical properties and safety of the battery pack.

Since the battery cell test point that is capable of testing the functions of the battery pack is exposed outward through the through hole formed at one side of the pack case, an additional to test the functions of the battery pack is not needed. Specifically, the battery pack according to the present invention does not require a connector or a test circuit extending outward to test the functions of the battery pack. That is, a connection terminal of a function tester may be inserted into the battery cell test point of the PCM through the through hole to easily and conveniently test the functions of the battery pack, thereby more easily performing a test operation. Consequently, it is possible to improve efficiency of a battery pack production process.

In another concrete example, the pack case may be provided at one side thereof with an opening, through which a bus bar or a wire extends outward from the PCM. The opening may be located at any side of the pack case. Preferably, the opening is located at a side of the pack case adjacent to the sealed surplus portion of the battery cell.

The bus bar or the wire extends from a PCM connection terminal part and is electrically connected to an external connection terminal part, i.e. a circuit of an external device. The bus bar or the wire may function as an electrical conduction member to charge and discharge and sense the battery cell received in the pack case.

In accordance with another aspect of the present invention, there is provided a method of manufacturing the battery pack with the above-stated construction. The method of manufacturing the battery pack according to the present invention includes (a) connecting electrode terminals of a battery cell to a PCM by welding, (b) loading the PCM on a sealed surplus portion of the battery cell, (c) mounting the battery cell in a mold, (d) applying a plastic resin to the sealed surplus portion of the battery cell, the PCM, and opposite sides of the battery cell, and (e) removing the battery cell from the mold.

In a concrete example, the welding is not particularly restricted so long as electrical connection between the electrode terminals of the battery cell and the PCM is achieved. Preferably, the welding is spot welding.

In accordance with a further aspect of the present invention, there is provided a mobile device including the battery pack with the above-stated construction as a power source.

A concrete example of the mobile device in which the battery pack according to the present invention is used may be a laptop computer, a netbook computer, a tablet PC, or a smart pad.

The above-described devices and apparatuses are well known in the art to which the present invention pertains and, therefore, a detailed description thereof will be omitted.

Effects of the Invention

As is apparent from the above description, the present invention has effects in that it is possible to manufacture a battery pack having a small thickness without using an ultrasonic welding method, it is not necessary to use an accurate and high-priced ultrasonic welding machine, an assembly process of the battery pack is very simplified, the battery pack includes a pack case configured to have a specific structure such that the battery pack has proper strength against external impact and high resistance to a short circuit or a cut off although the pack case has a small thickness, and the number of components constituting the battery pack is reduced, thereby reducing manufacturing cost and improving efficiency of a battery pack assembly process.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing a general pouch-shaped battery;

FIG. 2 is a perspective view showing an assembled state of the pouch-shaped battery of FIG. 1;

FIG. 3 is a perspective view showing a conventional battery pack having a pouch-shaped battery mounted therein;

FIG. 4 is an exploded perspective view showing the battery pack of FIG. 3;

FIG. 5 is a perspective view showing a battery pack according to an embodiment of the present invention;

FIG. 6 is an exploded perspective of the battery pack shown in FIG. 5; and

FIGS. 7 to 11 are typical views showing a process of manufacturing a battery pack according to an embodiment of the present invention.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

FIG. 5 is a perspective view showing a battery pack according to an embodiment of the present invention and FIG. 6 is an exploded perspective of the battery pack shown in FIG. 5.

Referring to FIG. 5, a battery pack 600 is configured to have a structure in which the upper end and opposite sides of a plate-shaped battery cell 100 are covered by a pack case 500 in a state in which the top and bottom of the battery cell 100 are exposed outward. An external input and output terminal 400 extends outward from the upper end of the pack case 500. In addition, an through hole 510, through which a batter cell test point (not shown) of a protection circuit module (PCM) 200 extends outward, is formed at the upper end of the pack case 500.

Referring to FIG. 6, the battery pack 600 generally includes a total of three members (the battery cell 100, the pack case 500, and the PCM 200). In addition, the battery pack 600 further includes two members (insulating tapes 310 and 320 and the external input and output terminal 400).

Specifically, the battery cell 100 is provided at one side thereof including a sealed surplus portion 130 with an anode terminal 110 and a cathode terminal 120.

The pack case 500 is configured to have a structure including a total of three sides, such as a side 510 to cover the upper end of the battery cell 110 and sides 520 to cover opposite sides of the battery cell 100. Consequently, the pack case 500 is formed in a 'Π' shape when viewed in plane.

Although not shown in FIG. 6, the pack case 500 may be configured to have a structure to further cover a lower end 143 of the battery cell 100 according to circumstances. In this case, the pack case 500 may be formed in a '☐' shape when viewed in plane.

In addition, the external input and output terminal 400, which extends outward in a state in which the external input and output terminal 400 is connected to an external input and output terminal part 230, is formed at one side of the PCM 200.

The pack case 500 shown in FIG. 6 is simply spread to typically show the components of the battery pack 600. Actually, however, the pack case 500 is integrated with the PCM 200 and opposite sides 141 and 142 of the battery cell 100.

In addition, the pack case 500 is made of a plastic resin. Specifically, the plastic resin is thermally melted, applied to the PCM 200 and opposite sides 141 and 142 of the battery cell 100, and solidified to form the pack case 500.

FIGS. 7 to 11 are typical views showing a process of manufacturing a battery pack according to an embodiment of the present invention.

Referring to these drawings together with FIG. 6, at a first step A, electrode terminal joint parts 210 and 220 of a PCB 200 are connected to electrode terminals 110 and 120 of a battery cell 100, respectively. Specifically, the electrode terminals 110 and 120 of the battery cell 100 are respectively connected to the electrode terminal joint parts 210 and 220 of the PCB 200 by spot welding (see reference numeral 111).

At a second step B, the electrode terminal joint parts 210 and 220 of the PCB 200 are bent (see reference numeral 112) such that the electrode terminal joint parts 210 and 220 of the PCB 200 are directed downward.

At a third step C, an insulating tape 310, which also functions as a double-sided adhesive tape, is attached (see reference numeral 113) to a sealed surplus portion 130 of the battery cell 100.

At a fourth step D, the electrode terminals 110 and 120 of the battery cell 100 are bent (see reference numeral 114) such that the PCM 200 is loaded on the sealed surplus portion 130 of the battery cell 100. At this time, the PCM 200 is securely loaded on the sealed surplus portion 130 of the battery cell 100 due to the insulating tape 310, which also functions as the double-sided adhesive tape.

Finally, as a fifth step E, a plastic resin is thermally melted, applied to the PCM 200 and opposite sides 141 and 142 of the battery cell 100, and solidified to form a pack case 500.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack comprising:
    a plate-shaped battery cell having electrode terminals, including an anode terminal and a cathode terminal formed at an upper end thereof, the upper end of the battery cell further including a sealed surplus portion, wherein the battery cell is formed to have a planar quadrangular structure;
    a protection circuit module (PCM) including electrode terminal joint parts bent towards the electrode terminals and being directly and electrically connected to the electrode terminals to control operation of the battery pack, the PCM being adhesively attached to the sealed surplus portion of the battery cell via an insulating double-sided adhesive tape; and
    a pack case applied to the sealed surplus portion of the battery cell, the PCM, and opposite sides of the battery cell in a thermally molten state and solidified, the pack case being configured to have a structure to cover the sealed surplus portion of the battery cell, the PCM, and the opposite sides of the battery cell in a state in which a top and a bottom of the battery cell are open, wherein each of the opposite sides of the battery cell are adjacent to the upper end of the battery cell,
    wherein the electrode terminals extend outward from an upper end of the pack case at a first surface,
    wherein a lower end of the battery cell, opposite to the upper end of the battery cell, is open, and
    wherein the pack case is provided with a through hole at a second surface of the upper end thereof through which a side portion of the PCM received in the pack case is exposed outward, wherein the first surface is different from the second surface.

2. The battery pack according to claim 1, wherein the plate-shaped battery cell is a prismatic secondary battery or a pouch-shaped secondary battery.

3. The battery pack according to claim 2, wherein the pouch-shaped secondary battery is configured to have a structure in which an electrode assembly is received in a battery case made of a laminate sheet comprising a metal layer and a resin layer in a sealed state.

4. The battery pack according to claim 1, wherein the battery cell is a lithium secondary battery.

5. The battery pack according to claim 1, wherein the pack case has a thickness equal to a thickness of the battery cell or 10% or less greater than the thickness of the battery cell.

6. The battery pack according to claim 1, wherein the PCM is a printed circuit board (PCB) having a protection circuit printed thereon.

7. The battery pack according to claim 1, wherein the pack case is made of a plastic resin.

8. The battery pack according to claim 7, wherein the plastic resin is a thermoplastic resin, a melting point of which is within a temperature range in which deformation of devices located at the PCM is not caused.

9. The battery pack according to claim 1, wherein the side portion of the PCM is a battery cell test point.

10. The battery pack according to claim 1, wherein a side of the pack case adjacent to the sealed surplus portion of the battery cell is provided with an opening, through which a bus bar or a wire extends outward from the PCM.

11. A method of manufacturing a battery pack according to claim 1, the method comprising:
    connecting electrode terminals of a battery cell to a PCM by welding;
    bending the electrode terminal joint parts of the PCM;
    attaching an insulative double sided tape to the sealed surplus portion of the battery cell;
    bending the electrode terminals of the battery cell;
    loading the PCM on a sealed surplus portion of the battery cell via the insulating double sided tape;
    mounting the battery cell in a mold;
    applying a molten plastic resin to the sealed surplus portion of the battery cell, the PCM, and opposite sides of the battery cell and solidifying the molten plastic resin to form a pack case; and
    removing the battery cell from the mold.

12. The method according to claim 11, wherein the welding is spot welding.

13. A mobile device comprising a battery pack according to claim 1 as a power source.

14. The mobile device according to claim 13, wherein the mobile device is a laptop computer, a netbook computer, a tablet PC, or a smart pad.

* * * * *